United States Patent
Johnson et al.

(10) Patent No.: US 10,572,850 B2
(45) Date of Patent: Feb. 25, 2020

(54) VEHICLE BUILDING SYSTEM AND METHOD

(71) Applicant: General Electric Company, Schenectady, NY (US)

(72) Inventors: Christopher Donald Johnson, Niskayuna, NY (US); Srinivas Bollapragada, Niskayuna, NY (US); Harry Kirk Mathews, Jr., Niskayuna, NY (US); Ilkin Onur Dulgeroglu, Niskayuna, NY (US); Edward McQuillan, Lisle, IL (US); Steven Jay Tyber, Niskayuna, NY (US)

(73) Assignee: GE GLOBAL SOURCING LLC, Norwalk, CT (US)

( * ) Notice: Subject to any disclaimer, the term of this patent is extended or adjusted under 35 U.S.C. 154(b) by 487 days.

(21) Appl. No.: 15/142,485

(22) Filed: Apr. 29, 2016

(65) Prior Publication Data

US 2016/0342933 A1   Nov. 24, 2016

Related U.S. Application Data

(60) Provisional application No. 62/165,337, filed on May 22, 2015.

(51) Int. Cl.
*G06Q 10/08* (2012.01)
*B61L 25/02* (2006.01)
(Continued)

(52) U.S. Cl.
CPC .......... *G06Q 10/083* (2013.01); *B61L 25/028* (2013.01); *G06Q 10/06315* (2013.01); *B61L 27/0011* (2013.01)

(58) Field of Classification Search
CPC .... B61L 21/0011; B61L 25/028; B65G 63/00; G06Q 10/6312; G06Q 10/06313; G06Q 10/06315; G06Q 10/08; G06Q 10/083
See application file for complete search history.

(56) References Cited

U.S. PATENT DOCUMENTS 7,219,067 B1 * 5/2007 McMullen .......... B61L 27/0011
246/122 R
7,813,846 B2   10/2010 Wills et al.
(Continued)

FOREIGN PATENT DOCUMENTS

WO     2013172840 A1    11/2013

OTHER PUBLICATIONS

Ernst et al., "Efficient Loading of Intermodal Container Trains", National Rail Corporation, http://w3.unisa.edu.au/misg/2001/nrc/index.html, 2001.

(Continued)

*Primary Examiner* — Matthew S Gart
*Assistant Examiner* — Stephen S Swartz
(74) *Attorney, Agent, or Firm* — Christopher R. Carroll; The Small Patent Law Group, LLC

(57) ABSTRACT

A system for building a vehicle system determines cargo and vehicles to carry the cargo from a first location to a second location via one or more vehicle yards disposed between the locations. One or more characteristics of the vehicle yards are determined, as well as different builds of the vehicle system based on the cargo, the vehicle units, and the characteristics of the vehicle yards. The different builds designate different combinations of where the first cargo is carried in a vehicle system that includes the vehicle units and/or where the vehicle units are located relative to each other in the vehicle system. A build of the vehicle system is selected from among the different builds for forming the (Continued)

vehicle system according to the build in order to reduce the time spent handling or processing the vehicle system at another vehicle yard.

19 Claims, 5 Drawing Sheets

(51) Int. Cl.
*G06Q 10/06* (2012.01)
*B61L 27/00* (2006.01)

(56) References Cited

U.S. PATENT DOCUMENTS

| | | | |
|---|---|---|---|
| 7,937,193 B2 | 5/2011 | Philp et al. | |
| 8,725,761 B2 | 5/2014 | Rout | |
| 2002/0082814 A1* | 6/2002 | Doner | B61L 17/00 703/6 |
| 2002/0096081 A1* | 7/2002 | Kraft | B61B 1/005 104/26.1 |
| 2005/0289020 A1* | 12/2005 | Bruns | G06Q 10/08 705/28 |
| 2006/0251498 A1* | 11/2006 | Buzzoni | B65G 63/004 414/139.9 |
| 2007/0005200 A1* | 1/2007 | Wills | B61L 17/00 701/19 |
| 2010/0023190 A1 | 1/2010 | Kumar et al. | |
| 2013/0144670 A1* | 6/2013 | Kickbusch | G06Q 10/06 705/7.12 |
| 2013/0190952 A1 | 7/2013 | Severson | |
| 2014/0018954 A1 | 1/2014 | Friesen et al. | |
| 2014/0025419 A1* | 1/2014 | Ross | G06Q 10/06313 705/7.23 |
| 2014/0072398 A1* | 3/2014 | Lanigan, Sr. | B66C 19/007 414/809 |
| 2014/0188749 A1* | 7/2014 | Lanigan, Sr. | B61B 1/005 705/333 |
| 2015/0066561 A1* | 3/2015 | Wills | G06Q 10/06313 705/7.23 |
| 2015/0112476 A1* | 4/2015 | Torson | B65G 63/004 700/214 |
| 2015/0191186 A1* | 7/2015 | Lucisano | B61L 27/04 701/2 |

OTHER PUBLICATIONS

Lai et al., "A Rolling Horizon Framework for Intermodal Loading Assignment to Improve Fuel Efficiency", Pdf.io, Proceedings of 9th International Heavy Haul Railway Conference, Kiruna, Sweden, 2007.
"Intermodal Terminal Operating System", Intermodal Pro, http://www.tideworks.com/products/intermodalpro/, pp. 1-2, 2011.
Examination Report dated Jul. 9, 2019 for corresponding IN application No. 201644017125.
Examination Report dated Nov. 6, 2019 for corresponding AU application No. 2016203293.

* cited by examiner

VEHICLE BUILDING SYSTEM AND METHOD

CROSS-REFERENCE TO RELATED APPLICATIONS

This application claims priority to U.S. Provisional Application No. 62/165,337, which was filed on 22 May 2015, and the entire disclosure of which is incorporated herein by reference.

FIELD

Embodiments of the present disclosure generally relate to building vehicle systems formed from one or more propulsion-generating vehicle units and/or one or more non-propulsion-generating vehicle units.

BACKGROUND

Vehicle systems can transport cargo between distant locations by traveling from vehicle yard to vehicle yard along the way. For example, rail vehicles may be arranged in a train to transport rail cars carrying cargo from one rail yard to another. At one or more stops at the rail yards, rail cars and cargo may be removed from the trains and/or added to the trains. Eventually, the cargo bound for a scheduled destination reaches the destination by moving from yard to yard, although not on the same train. The cargo and/or rail car carrying the cargo may switch from train to train at different rail yards.

Currently, a rail yard takes apart incoming trains and combines rail cars and locomotives in the yard with the purpose of getting the cargo carried by the rail cars only to the next rail yard. That is, cargo may be handled by a rail yard simply by getting the cargo and/or rail car carrying the cargo on the next available train that is headed in the general direction of the destination of the cargo, with little thought or planning given to how the next rail yard will be forced to handle the cargo when the train is received in the next rail yard.

Significant inefficiencies result from this handling of cargo. For example, when the train is received in the next rail yard, the cargo and/or rail car carrying the cargo may be located in an inconvenient location for unloading the cargo and/or moving the rail car to another outbound train. As another example, several rail cars in the same train may be in locations along the length of the train that require significant time and effort to shuffle the cars through the rail yard for being included in another train that departs the rail yard.

BRIEF DESCRIPTION

In one embodiment, a system (e.g., a vehicle building system) includes an input device configured to determine first cargo and non-propulsion-generating vehicle units to carry the first cargo from a first location to a second location via one or more vehicle yards disposed between the first location and the second location. The input device also can be configured to determine one or more characteristics of the one or more vehicle yards. The system can include one or more processors configured to determine different builds of the vehicle system based on the first cargo, the non-propulsion-generating vehicle units, and the one or more characteristics of the one or more vehicle yards. The different builds can designate different combinations of one or more of where the first cargo is carried in a vehicle system that includes the non-propulsion-generating vehicle units or where the non-propulsion-generating vehicle units are located relative to each other in the vehicle system. The one or more processors are configured to select a first build from among the different builds for forming the vehicle system according to the first build.

In one embodiment, a method (e.g., for building a vehicle system) includes determining first cargo and non-propulsion-generating vehicle units to carry the first cargo from a first location to a second location via one or more vehicle yards disposed between the first location and the second location. The method also can include determining one or more characteristics of the one or more vehicle yards and determining different builds of the vehicle system based on the first cargo, the non-propulsion-generating vehicle units, and the one or more characteristics of the one or more vehicle yards. The different builds designate different combinations of one or more of where the first cargo is carried in a vehicle system that includes the non-propulsion-generating vehicle units or where the non-propulsion-generating vehicle units are located relative to each other in the vehicle system. The method also can include selecting a first build from among the different builds for forming the vehicle system according to the first build.

In one embodiment, another method (e.g., for building a vehicle system) includes determining cargo and non-propulsion-generating vehicle units to carry the cargo from a first location to a second location a vehicle yard disposed between the first location and the second location, determining one or more characteristics of the vehicle yard, determining different potential builds of the vehicle system based on the cargo, the non-propulsion-generating vehicle units, and the one or more characteristics of the vehicle yard. The different potential builds can designate different combinations of where the non-propulsion-generating vehicle units are located relative to each other in the vehicle system. The method also can include selecting a first build from among the potential builds for forming the vehicle system by determining which of the potential builds results in reduced processing time in the vehicle yard relative to one or more other builds of the potential builds.

BRIEF DESCRIPTION OF THE DRAWINGS

The subject matter described herein will be better understood from reading the following description of non-limiting embodiments, with reference to the attached drawings, wherein below.

DETAILED DESCRIPTION

Certain embodiments of the present disclosure provide systems and methods for determining how to form vehicle systems formed from two or more vehicle units. The vehicle units can include one or more propulsion-generating vehicles (e.g., locomotives or other types of vehicles, such as automobiles, marine vessels, etc.) and/or one or more non-propulsion-generating vehicles (e.g., rail cars, flat bed cars, trailers, etc.). The vehicle systems can include vehicle consists, such as groupings of two or more vehicles for travel along a route together. As one example, the vehicle system can be a train, but alternatively may be a platoon of two or more vehicles traveling together (e.g., two or more automobiles traveling as a group without being coupled with each other).

Figure 1:
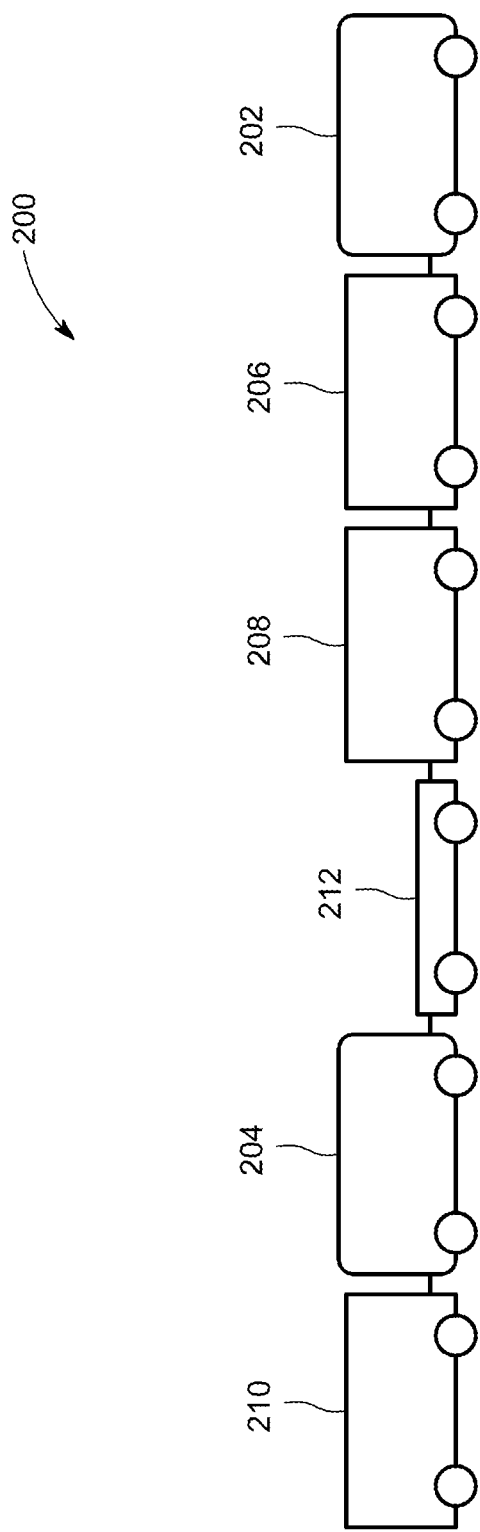
FIG. 1 illustrates one example of a vehicle system.

FIG. 1 illustrates one example of a vehicle system 200. The vehicle system 200 includes propulsion-generating vehicles 202, 204 and non-propulsion-generating vehicles 206, 208, 210, 212, which also may be referred to as vehicle units. The vehicle units 206, 208, 210 can represent container cars (e.g., cars having at least a bottom side to support cargo and at least two sets of two parallel walls to contain the cargo with in the vehicle units) while the vehicle unit 212 can represent a flatbed vehicle. In one example, the systems and methods described herein determine a build of a vehicle system that results in increased efficiency in taking the vehicle system apart at another location. The build of a vehicle system represents or designates the locations of different vehicle units within the vehicle system, the propulsion-generating vehicles that are included in the vehicle system, the locations of the propulsion-generating vehicles in the vehicle systems, etc.

Figure 2:
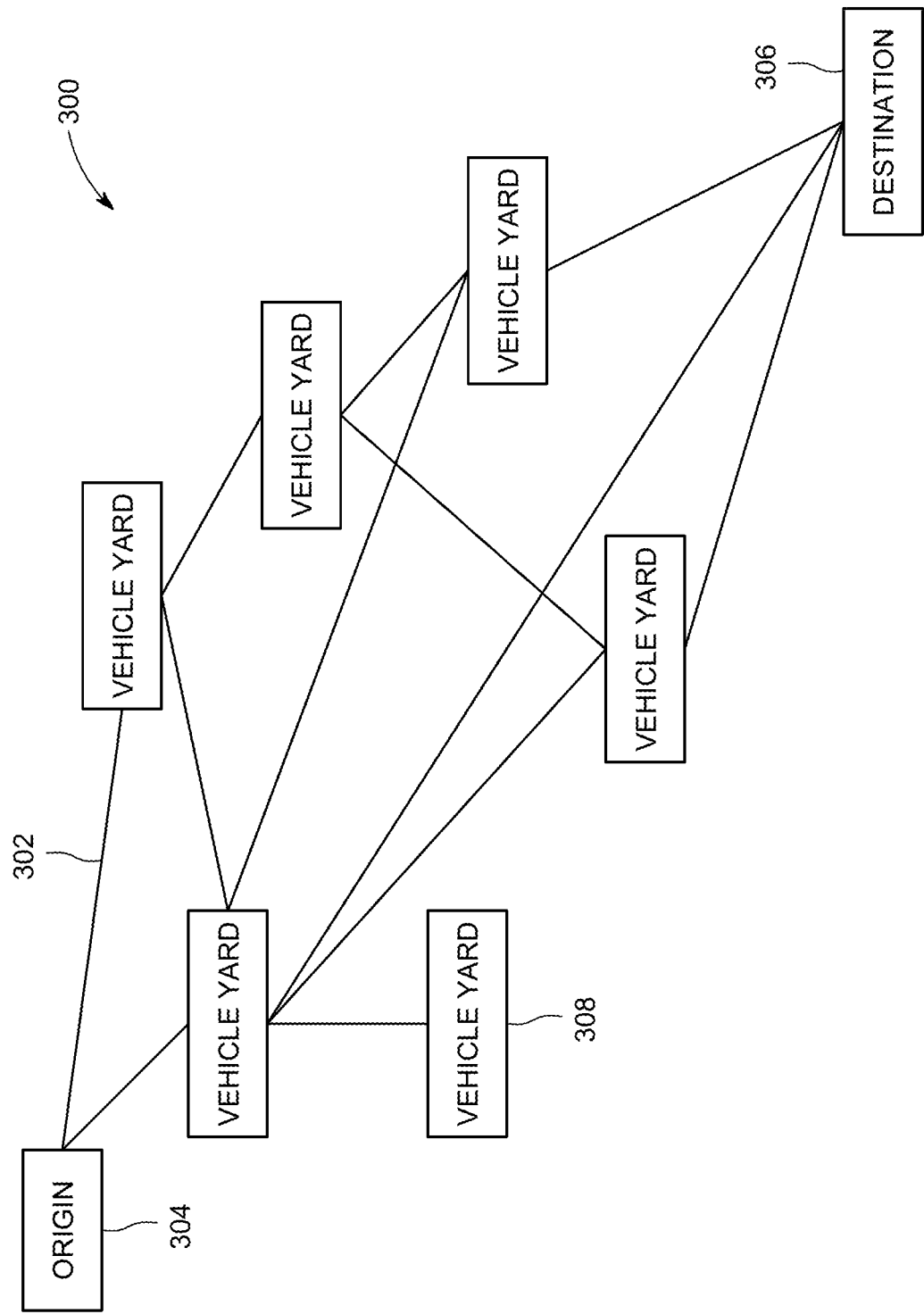
FIG. 2 illustrates one embodiment of a transportation network.

FIG. 2 illustrates one embodiment of a transportation network 300. The transportation network 300 includes interconnected routes 302, which can represent tracks, roads, waterways, paths in the air, or the like, for vehicle systems to travel along. The vehicle systems may travel from one or more origin locations 304 (e.g., "Origin" in FIG. 2) where a trip commences to one or more destination locations 306 (e.g., "Destination" in FIG. 2). During travel between origin and destination locations, the vehicle system that includes the vehicle units may stop at one or more intermediate locations 308 (e.g., "Vehicle Yard" in FIG. 2). The intermediate locations 308 can include vehicle yards, rail yards, or the like. One or more of the vehicle units in the vehicle system may be removed from the vehicle system and/or one or more vehicle units may be added to the vehicle system at one or more of the intermediate locations.

Figure 3:
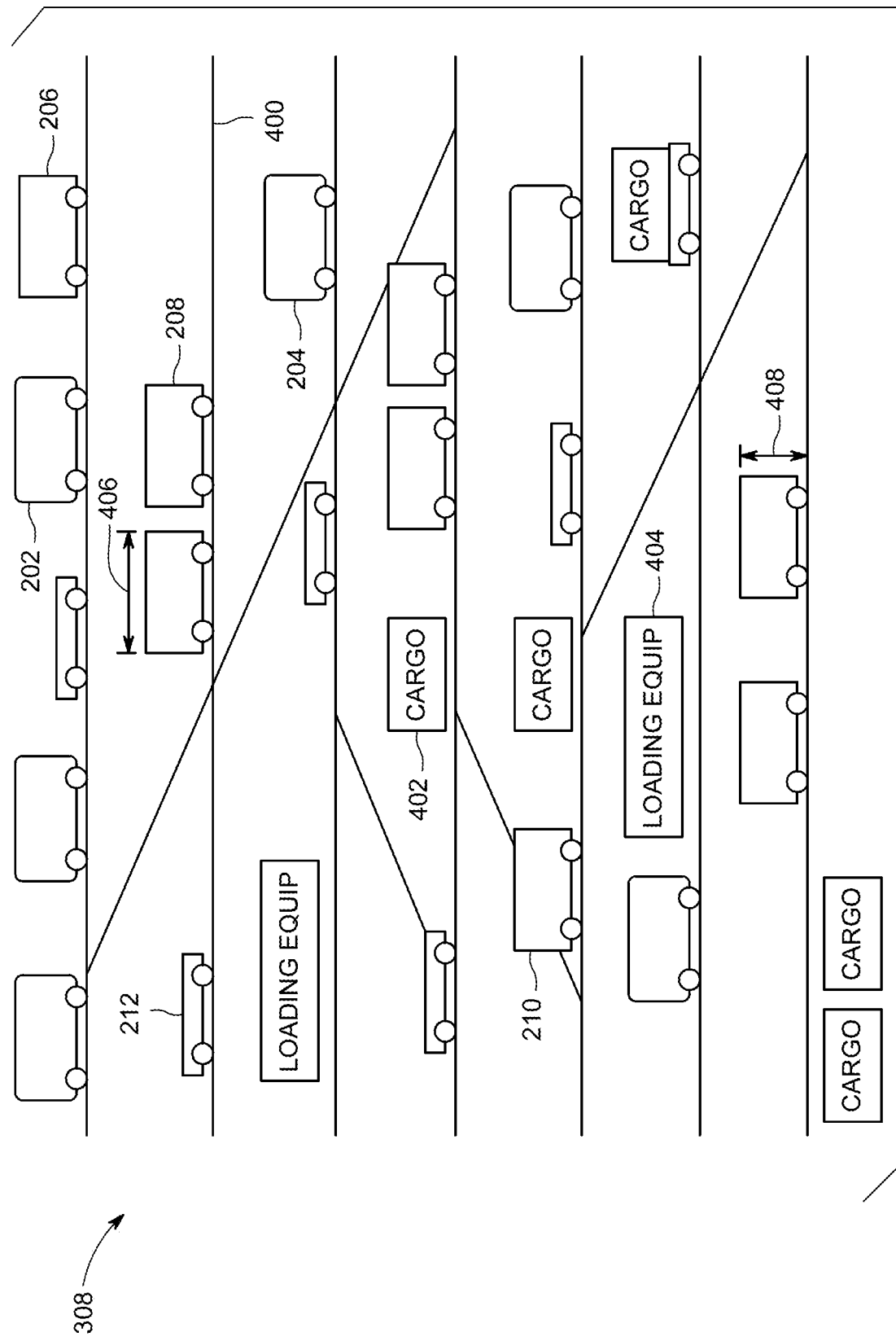
FIG. 3 illustrates one embodiment of a vehicle yard shown in FIG. 2.

FIG. 3 illustrates one embodiment of a vehicle yard 308 shown in FIG. 2. The vehicle yard 308 can include several interconnected yard routes 400. These routes 400 may be used for receiving vehicle systems into the vehicle yard 308, separating the vehicle systems (e.g., by removing vehicle units and/or propulsion-generating vehicles from the vehicle systems), performing maintenance on the vehicle units and/or propulsion-generating vehicles, loading cargo onto the vehicle units, and combining vehicle units and propulsion-generating vehicles into other vehicle systems for departure from the vehicle yard 308. With respect to rail yards, these routes 400 can include receiving tracks, hump tracks, classification tracks, departure tracks, etc.

As shown in FIG. 3, the vehicle units 206, 208, 210, 212 and propulsion-generating vehicles 202, 204 from several vehicle systems 200 (shown in FIG. 1) can be separated from each other upon arrival of the vehicle systems 200 into the vehicle yard 308. The vehicle units and propulsion-generating vehicles may become separated and spread out from each other throughout the different routes 400 of the vehicle yard 308. Cargo 402 may be unloaded from and/or loaded onto different vehicle units within the vehicle yard 308. Loading equipment 404 may be disposed within the vehicle yard 308 to assist in loading cargo 402 onto the vehicle units and/or unloading cargo 402 from the vehicle units. The loading equipment 404 can include cranes, forklifts, personnel, elevators, or the like. In one example, some of the loading equipment 404 is fixed in position in the yard 308 and cannot be moved between different locations within the yard 308. As a result, the vehicle units that receive cargo 402 and/or unload cargo 402 using the loading equipment 404 may need to be located at the location of the loading equipment 404.

Prior to departure from the vehicle yard, a vehicle system may be formed or built according to a build of the vehicle system. The vehicle units and propulsion-generating vehicle(s) that are included in the vehicle system according to the build can be arranged within the vehicle yard in the sequence (e.g., spatial order) dictated by the build, and then the vehicle system can depart from the vehicle yard. The build can dictate which vehicle units are to be included in the vehicle system, where the vehicle units are located within the vehicle system, where cargo is to be located in the vehicle system (e.g., which vehicle units are to carry the cargo), which propulsion-generating vehicles are to be included in the vehicle system, and/or where the propulsion-generating vehicles are to be located in the vehicle system.

In order to reduce the time and effort involved in removing and/or adding vehicle units to the vehicle system, loading and/or unloading cargo, adding and/or removing propulsion-generating vehicles at the intermediate locations, the systems and methods described herein may determine a build of the vehicle system that reduces the time and/or effort required to remove and/or add vehicle units, cargo, and/or propulsion-generating vehicles at the intermediate locations. For example, groups of vehicle units headed to the same location may be next to each other in the build of the vehicle system, vehicle units requiring specialized equipment to remove the vehicle units from the vehicle system may be positioned within the vehicle system such that the vehicle units are located near the equipment when the vehicle system arrives at the vehicle yard, etc. The systems and methods described herein determine builds of the vehicle system by looking ahead or planning ahead to how the build of the vehicle system will impact cargo loading and/or unloading, vehicle unit removal and/or addition, and/or propulsion-generating vehicle removal and/or addition at future or upcoming stops of the vehicle system at other vehicle yards. Optionally, the systems and methods described herein may determine a build of a vehicle system that results in improved efficiency in operating the vehicle system, such as by reducing fuel consumed by the vehicle system, reducing emissions generated by the vehicle system, reducing travel time of the vehicle system, or the like (relative to a different build of the vehicle system).

Current techniques for determining builds of vehicle systems focus on getting cargo out of one vehicle yard to another vehicle yard as quickly as possible, without consideration being given to the time and/or cost of unloading or otherwise moving the cargo, vehicles moved from one or more incoming strings (e.g., groups of connected vehicles) to a reassignment to multiple different strings for departure from a vehicle yard, or vehicles at downstream or upcoming vehicle yards. These techniques essentially "kick the can down the road" with cargo by letting another vehicle yard deal with how to move, load, and/or unload cargo. The systems and methods described here determine builds of vehicle systems that take into consideration and are based on how the locations of the vehicle units and/or propulsion-generating vehicles will impact the loading and/or unloading of cargo at upcoming vehicle yards. As a result, the overall efficiency in getting cargo from an origin location to a final destination location can be reduced relative to the current techniques.

A variety of factors and decision points can be considered by the systems and methods described herein to determine the build of a vehicle system. The systems and methods may determine a build that matches the sizes of containers having the cargo being carried by the vehicle units to sizes of the vehicle units. For example, if a rolling stock car (e.g., unit 208, 210, 212) has a length dimension 406 between opposite ends of the car that allows up to seventeen meters of length of containers to be carried by the rolling stock car, the systems and methods described herein can determine a build of the vehicle system that includes as much of the seventeen meters of the length of the rolling stock car to be occupied as possible.

The systems and methods may determine a build of the vehicle system by selecting containers to be carried by the vehicle units as a function of proximity of the containers in the vehicle yards to the vehicle units. For example, the cargo 402 in a vehicle yard 308 that a vehicle system is traveling toward may be located along different routes 400 of the vehicle yard 308, as shown in FIG. 3. The selection of which vehicle units will carry different cargo when the vehicle system arrives at the vehicle yard may be based on where the containers having the cargo 402 are located in the yard 308 and where the vehicle units will be located in the yard 308 when the vehicle system arrives.

For example, in determining a build for a vehicle system traveling from a first vehicle yard to a second vehicle yard, and then to a third vehicle yard, the systems and methods may determine locations of cargo in the second vehicle yard and which vehicle units can carry the cargo. If the cargo in the second vehicle yard is located far from where the vehicle system is scheduled to enter the yard, then the build for the vehicle system traveling from the first vehicle yard to the second vehicle yard may be determined such that the vehicle unit that is to receive the cargo is located closer to the front or leading end of the vehicle system (along a direction of travel). As a result, the vehicle unit is located closer to the cargo when the vehicle system arrives at the vehicle yard (relative to the vehicle unit being closer to the trailing end of the vehicle system. Similarly, if loading equipment that is to be used to remove the cargo from the vehicle unit is located relatively close to the location where the vehicle system enters into the third vehicle yard, then the build for the vehicle system to travel from the second yard to the third vehicle yard may include moving the vehicle unit from closer to the leading end to closer to the trailing end of the vehicle system. As a result, the vehicle unit may be located closer to the loading equipment needed to unload the cargo when the vehicle system arrives at the third vehicle yard. Locating the vehicle units in the vehicle systems such that less movement of the vehicle unit is needed to load and/or unload cargo, position the vehicle unit near loading equipment, and the like, can reduce the cycle time, fuel costs, and labor in loading and unloading the vehicle units.

The systems and methods can determine a build of the vehicle system by preventing neighboring vehicle units from having significant differences in height. For example, the systems and methods may avoid placing a vehicle unit having a smaller vertical height dimension 408 in front of a vehicle unit having a taller vertical height dimension to reduce drag forces on the vehicle system. The vertical height dimensions may be measured from the route 400, the surface on which the route 400 is disposed, or from another location.

The systems and methods can determine the build of a vehicle system by limiting the sizes of horizontal gaps between neighboring vehicle units in the vehicle system. For example, the systems and methods may determine and examine builds that do not include the neighboring vehicle units being separated by more than a threshold distance, such as three meters, four meters, or another distance. Limiting the separation distance between the vehicle units can reduce the wind drag on the vehicle system relative to vehicle systems having larger separation distances between the vehicle units.

The systems and methods may determine the build of the vehicle system based on commercial prioritization on load throughput, placement, or handling. For example, the build may be determined to cause containers associated with contractual obligations having greater value than other containers to arrive at destination locations faster than other containers. Such a build can be determined by ensuring that the vehicle system carries the higher priority containers on vehicle units that will reach the destination location faster than other vehicle units, on vehicle units in locations of the vehicle system that are removed from the vehicle system and placed onto another vehicle system faster than other vehicle units, etc.

The systems and methods may determine a build of the vehicle system by selecting one or more types of couplers to be included in the vehicle system. The couplers may mechanically couple neighboring vehicles in the vehicle system. Different types of devices may be used as couplers. For example, a draft coupler or draft gear, Type E couplers, Type F couplers, Type H couplers, end of car cushioning (EOCC) couplers, etc., may be different coupler types that can be used to connect neighboring vehicles in vehicle systems. In determining a build for a vehicle system traveling from one vehicle yard to another vehicle yard, the systems and methods may determine what type of couplers to use for connecting neighboring vehicles in the vehicle system.

The build of a vehicle system can be determined by assigning a propulsion-generating vehicle to travel along a route for purposes of getting the vehicle to a scheduled and intended maintenance workscope. The location that is selected for the maintenance may be selected based on availability of the location to perform the maintenance, a preferred work loading sequence to benefit (e.g., reduce or keep below a threshold) the workloads at one or more locations, parts availability, availabilities of personnel skills or expertise, etc.

A build may be determined by assigning one or more propulsion-generating vehicles to a set of non-propulsion-generating vehicles (e.g., cars) as a function of the state of fitness of the propulsion-generating vehicles and/or non-propulsion generating vehicles for reliable duty and subsequent integrated control of the propulsion-generating vehicles in such a way as to dynamically ensure that the impairments of any vehicle are not exceeded beyond a determined level of life consumption, stress or any other mechanical or electrical feature giving rise to the impairment.

The systems and methods also can determine the build of the vehicle system subject to various constraints. For example, rules, regulations, laws, or the like, may prevent hazardous materials from being carried by some vehicle systems, may prevent some cargo from being onboard a vehicle system too close to another type of cargo, may restrict the sizes of containers that can be carried by the vehicle system, or the like.

The schedules of different vehicle systems can be used to determine blocks or groups of vehicle units in the build of a vehicle system. For example, the systems and methods can examine schedules of different vehicle systems to determine which vehicle systems are arriving and/or departing from different vehicle yards, the next destination locations of the vehicle systems, the times at which the vehicle systems arrive and/or depart, etc., to determine which vehicle units in a build of one vehicle system should be next to each other to allow for faster transition of the vehicle units from the vehicle system to another vehicle system at another vehicle yard.

The available propulsion-generating vehicles at different vehicle yards also may be considered by the systems and methods for determining a build of a vehicle system. The systems and methods can examine which propulsion-generating vehicles are available at different vehicle yards and when the propulsion-generating vehicles are available in order to determine a build of a vehicle system that does not include an excess of tractive effort from the propulsion-generating vehicles above a threshold amount (e.g., what is needed to propel the vehicle system).

Propulsion-generating vehicles may be selected for a targeted reliability of the vehicle system with respect to the contractual values of cargo being carried by the vehicle system, service level agreement satisfaction, and/or schedule priority. For example, for a vehicle system having vehicle units associated with a more urgent need to get the cargo to a destination location (e.g., due to potential spoilage, contractual requirements, etc.), newer and/or more recently inspected propulsion-generating vehicles may be included in the build relative to vehicle systems having vehicle units with less urgent needs. As another example, some vehicle units may carry cargo pursuant to service level agreements that are satisfied or complied with when the cargo is delivered within a designated time window, but that are not satisfied or complied with when the cargo is delivered before or after the designated time window. The build of a vehicle system can be determined to satisfy the service level agreements (e.g., by including more powerful propulsion-generating vehicles and/or more propulsion-generating vehicles and/or more reliable propulsion-generating vehicles as a function of cargo criticality or severe network effects should a propulsion-generating vehicle fail at a network bottleneck location to ensure on-time arrival). With respect to schedule priority, the build of a vehicle system can be determined to match the available propulsion-generating vehicles with vehicle systems so that traffic, bottlenecks, and service level agreement disruptions are reduced while also complying or co-optimizing service and emissions constraints.

The systems and methods may determine a build to reduce the likelihood of the vehicle system breaking apart during travel, such as by placing propulsion-generating vehicles in various locations within the vehicle system, limiting the weight of cargo being carried by different vehicle units, positioning the vehicle units carrying heavier loads closer to propulsion-generating vehicles in the vehicle system than other vehicle units, etc.

The factors and inputs described herein that are used to determine a build of a vehicle system can be considered alone or in combination. For example, a build of a vehicle system may be determined to only ensure that a service level agreement is satisfied. As another example, the build may be determined by placing different weights on two or more different factors.

The systems and methods can communicate with other systems to implement the build of a vehicle system. For example, the build of a vehicle system can be communicated with terminals, yard planning systems, or the like, to cause equipment controlled by the terminals, yard planning systems, or the like, to sequence the vehicle units in the vehicle system according to the build that is determined. Optionally, one or more metrics may be determined. For example, the simulations of the builds may provide estimated times of arrival for various vehicle systems, vehicle units, cargo, etc., at various locations in a transportation network, estimated amounts of fuel consumed by the vehicle systems, routes that the vehicle systems are to travel along, and the like. During and/or after actual travel of the vehicle systems, vehicles units, cargo, etc. that are formed according to the builds that are selected from the simulations, the actual times of arrival, actual amounts of fuel consumed, actual routes traveled, and the like, may be compared to the estimated values for the amounts obtained from the simulations. Differences from the simulation and actual travel may be determined and used to modify how the vehicle systems and/or vehicle yards are operated during future trips. For example, the techniques used by the vehicle yards to load, unload, and/or move cargo may be changed, the throttle and/or brake settings of the vehicle systems may be changed, or the like. In another example, the build that is selected may be actually controlled during travel along the routes according to the simulation used to select the build. For example, the selected build may be selected based on a simulation of travel of the vehicle system. This simulation may use simulated throttle settings, brake settings, and the like, at different locations. The simulated throttle settings, brake settings, and the like, may then be used at the same locations during actual control of the vehicle system.

In one embodiment, the build of a vehicle system may be determined by testing, with a computable mathematical expression, various different builds of the vehicle system and selecting one of the builds as a selected build. A computer system may determine many different permutations of builds of the vehicle units in a vehicle system. Due to the large number of vehicle units that can be included in a vehicle system, the large number of different propulsion-generating vehicles that may be included in the vehicle system, the many different destination locations for the vehicle units, the different locations and schedules of vehicle yards, and the like, the total number of permutations for a build of a vehicle system can be exceptionally large. The computer system may then simulate travel of the different builds of the vehicle system (and/or one or more other vehicle systems) to determine how efficiently the vehicle system travels when using the build, how much traffic is impacted (negatively or positively) when the vehicle system travels using the build, etc. While a human being may not be able to mentally determine all potential builds of a vehicle system and simulate travel of all of these builds, a computer system can do so and complete the simulation much faster than a human being. For example, a computer system may be able to determine all permutations of a build for a vehicle system, to simulate travel of all different build permutations, and to select the build that is more efficient (e.g., based on fuel consumption, travel time, commercial priority, labor usage, equipment usage, etc.) than one or more, or all, other builds for the build to be used to construct a vehicle system in a commercially reasonable time period. Such a time period can be short enough in duration that the cargo being carried by the vehicle system does not spoil, violate contractual delivery obligations, or the like. Conversely, a human being may not be able to mentally determine all permutations of a build, simulate travel of all different build permutations, and select the efficient build within a commercially reasonable time period.

The systems and methods described herein provide for a multi-example, co-optimization of terminal and vehicle system operations having a goal to lower cycle time (e.g., the time needed to remove and/or add vehicle units), lower fuel expense, and lower variable labor expense. As used herein, the term "optimize" and variation thereof refers to a more efficient build of a vehicle system than may be achieved by human intelligence alone, due to the consequences of each decision. As such, an optimized build may or may not include the most efficient build for a vehicle system, but may be more efficient than one or more other builds, but not necessarily all other possible builds.

The systems and methods can determine placements of cargo onto a vehicle system for variable cost and robust scheduling or workflow in a terminal (e.g., a vehicle yard), while also enabling robust dynamical control of the builds of the vehicle systems to lower fuel expense, chances of breakage in the vehicle systems, and wear of the vehicle units and propulsion-generating vehicles. A build may be determined so that the vehicle units are arranged next to each other in destination blocks on a vehicle system such that movements of the vehicle systems over routes and transfer yard movements are reduced. Schedules for the vehicle systems may be generated using the destination blocks of vehicle units to cause the units within a block to travel together to a destination location, without all of the other vehicle units in the same vehicle system traveling to the same destination location.

Figure 4:
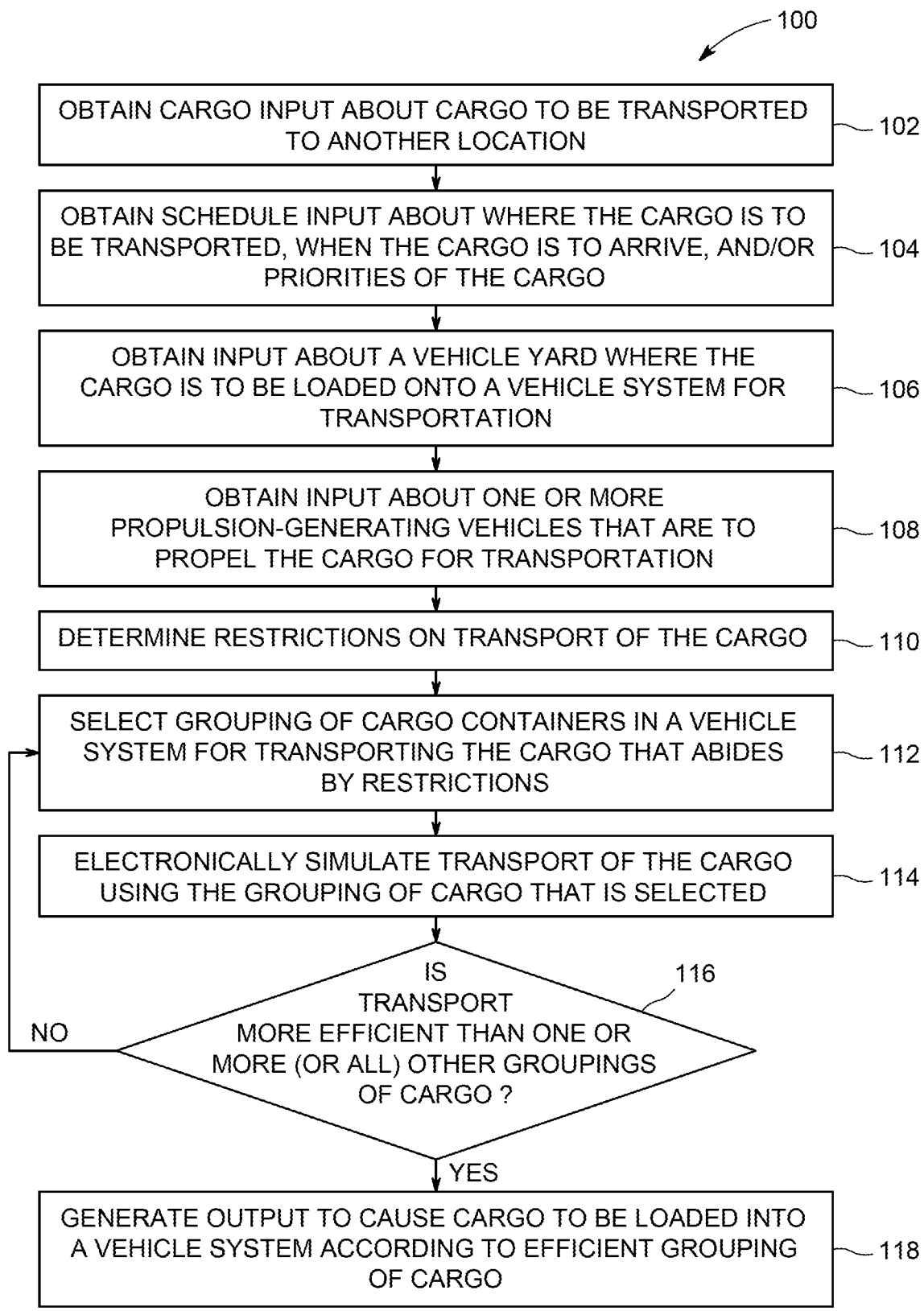
FIG. 4 illustrates a flowchart of a method for determining a build of a vehicle system according to one embodiment.

FIG. 4 illustrates a flowchart of a method 100 for determining a build of a vehicle system according to one embodiment. The method 100 may be used to identify which propulsion-generating vehicles and vehicle units to include in a vehicle system and where the propulsion-generating vehicles and vehicle units are to be located in the vehicle system. At 102, cargo input is obtained. The cargo input can include information about cargo that is to be transported from one location to another location. This information can include the size of containers that carry the cargo, weight and/or mass of the cargo, restrictions on handling of the cargo (e.g., where the cargo includes hazardous material, unusual shapes, or the like), etc. The cargo input can be obtained from the parties to a contract for delivery of the cargo, from a vehicle yard planning system (e.g., a system that plans operations within a vehicle yard), from a scheduling system (e.g., a system that schedules movements of many vehicle systems), or from another location.

At 104, schedule input is obtained. The schedule input can include information about where the cargo is to be transported, when the cargo is to arrive, and/or priorities of the cargo. Examples of schedule input include origin and/or destination locations of the cargo, scheduled times of delivery of the cargo, scheduled times of departure of the cargo, scheduled times of arrival of the cargo at one or more vehicle yards, commercial priorities of the cargo, contractual agreements related to the cargo (e.g., service level agreements), restrictions on delivery of the cargo (e.g., cargo that will spoil or otherwise decrease in value after a designated period of time), etc. The schedule input can be obtained from the parties to a contract for delivery of the cargo, from a vehicle yard planning system (e.g., a system that plans operations within a vehicle yard), from a scheduling system (e.g., a system that schedules movements of many vehicle systems), or from another location.

At 106, vehicle yard input is obtained. The vehicle yard input can include information about one or more vehicle yards that the vehicle system is currently in, that the vehicle system will travel to during movement from a current or origin location to a final destination, and/or a final destination of the vehicle system. In one embodiment, the vehicle yard input includes information on where equipment used to load and/or unload cargo from vehicle units is located in a vehicle yard.

At 108, power input is obtained. The power input can include information about one or more propulsion-generating vehicles that can be included in a vehicle system to propel the cargo being carried by the vehicle system for transportation of the cargo. This information may include the location of propulsion-generating vehicles, schedules of propulsion-generating vehicles, power outputs (e.g., horsepower) of the propulsion-generating vehicles, repair and/or maintenance histories of the propulsion-generating vehicles, or the like.

At 110, one or more restrictions on transportation of the cargo are determined. The restrictions can limit how certain cargo is handled, such as hazardous materials. For example, the restrictions can prevent some cargo from being transported to or through certain locations (e.g., urban areas). The restrictions can prohibit cargo from being located in a vehicle system close to another type of cargo or vehicle (e.g., flammable or explosive materials may be kept at least a threshold distance away from cargo or vehicles that may generate sparks, fire, etc.).

At 112, a build of a vehicle system is selected. The build can include a grouping of cargo containers in the vehicle system, the vehicle units that carry the cargo containers, the propulsion-generating vehicles in the vehicle system, and an order (e.g., sequence) of the vehicle units and propulsion-generating vehicles in the vehicle system. The build may be determined by arranging the vehicle units and propulsion-generating vehicles in an order in the vehicle system that does not violate the restrictions determined at 110. For example, a build that places hazardous cargo in a location that violates a restriction on the cargo may not be selected. As another example, a build that does not include sufficient tractive effort to propel the vehicle system may not be selected.

At 114, transportation of the cargo using the build of the vehicle system that is selected is simulated. The movement of the vehicle system from an origin location to a final destination location, including removing one or more vehicle units at one or more vehicle yards and/or adding one or more vehicle units at the one or more vehicle units, can be electronically simulated by a computer system. The simulation also can simulate concurrent movements of builds of other vehicle systems as well in order to determine if the builds of the vehicle systems result in traffic jams, bottlenecks, or the like.

At 116, a determination is made as to whether transporting the cargo using the selected build of the vehicle system is more efficient than one or more (or all) other builds that are simulated. For example, the method 100 may repeatedly determine different builds for one or more vehicle systems and simulated movements of the different builds in order to identify a build that successfully causes the cargo to be delivered to different locations while abiding by applicable restrictions and reducing fuel consumption, fuel costs, emission generation, labor costs, and/or travel time relative to one or more other builds. If the currently selected and simulated build is more efficient than one or more, or all, other builds, then flow of the method 100 can proceed to 118. Otherwise, flow of the method 100 can return to 112. For example, the method 100 may identify another build of the vehicle system and simulate movement of the other build as described above.

At 118, output is generated to cause the vehicle system to be formed and/or scheduled to travel according to the build that was found to be more efficient than one or more, or all, other builds. For example, the cargo can be loaded into the vehicle units of the vehicle system and vehicle units can be added to and/or removed from the vehicle system according to the build identified as being more efficient than one or more, or all, other builds of the vehicle system. The output that is generated can be one or more communication signals that are sent to scheduling systems, yard planning systems, or other locations that control how the vehicle system is formed, moved, and the like, so that the vehicle system is formed and controlled according to the efficient build of the vehicle system.

Figure 5:
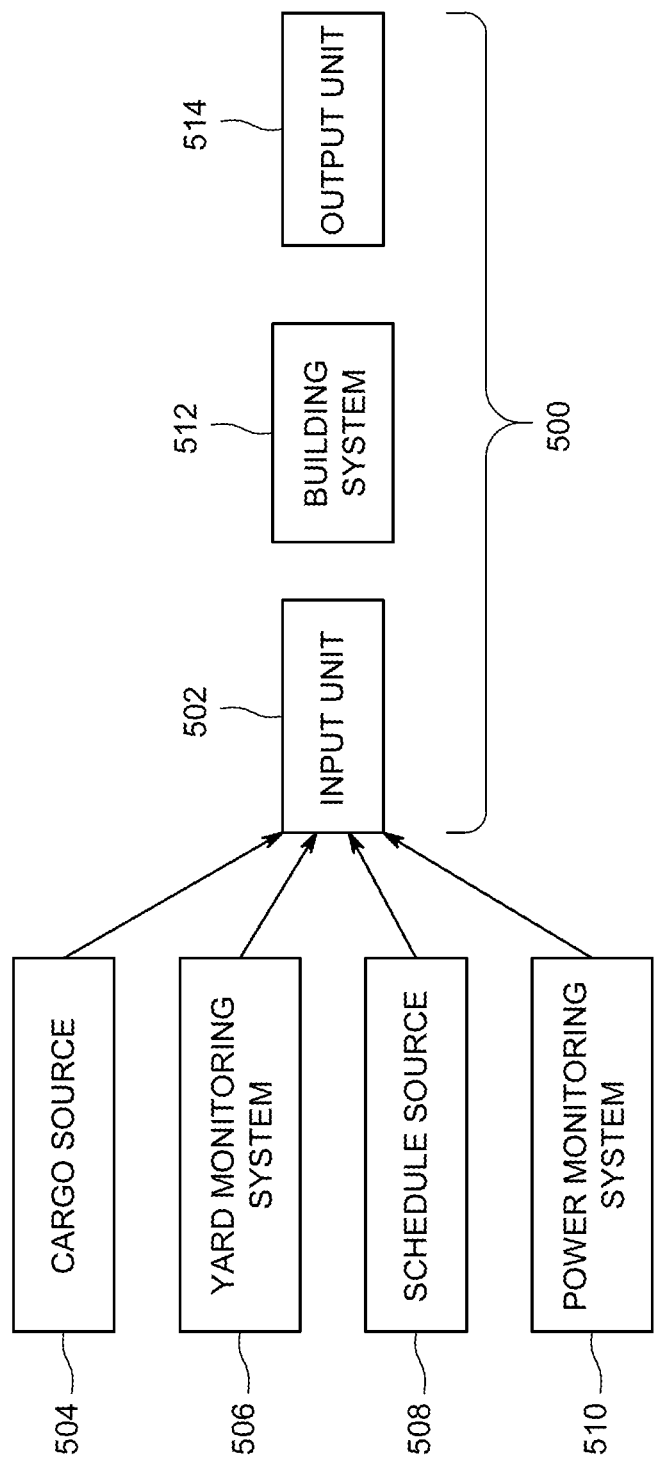
FIG. 5 illustrates one embodiment of a vehicle building system.

FIG. 5 illustrates one embodiment of a vehicle building system 500. The system 500 may be used to determine a build of a vehicle system. For example, the system 500 can perform one or more embodiments or variations of the subject matter described herein (including the method 100) to determine various potential builds of a vehicle system, simulate travel of the vehicle system and/or other vehicle systems using the potential builds, and selecting a build for use in forming the vehicle system.

The system 500 includes an input unit or device 502 that receives various inputs from different sources of information. The input unit or device 502 can represent hardware circuitry that communicates information. For example, the input unit or device 502 can include transceiving circuitry, an antenna, modem, router, cables, or the like, for receiving electronic signals from various sources. Optionally, the input unit or device 502 may include a device that receives manually input information, such as a touchscreen, keyboard, stylus, electronic mouse, speaker, optical scanner, or the like.

The input unit or device 502 can communicate with a variety of sources for the information used to determine potential builds of a vehicle system, simulate travel using the different builds, and to select a build for using to construct a vehicle system. These sources can include a cargo source 504 that provides cargo input, which can include information about cargo that is to be transported from one location to another location. This information can include the size of containers that carry the cargo, weight and/or mass of the cargo, restrictions on handling of the cargo (e.g., where the cargo includes hazardous material, unusual shapes, or the like), etc. The cargo input can be obtained from the parties to a contract for delivery of the cargo, from a vehicle yard planning system (e.g., a system that plans operations within a vehicle yard), from a scheduling system (e.g., a system that schedules movements of many vehicle systems), or from another location. The cargo source 504 can represent one or more computer devices, such as a computer, service, handheld device (e.g., mobile phone, tablet computer, etc.), or the like, that stores the cargo input. For example, cargo sources 504 may be a dispatch facility that tracks locations of cargo, shipping companies that pay for shipment of the cargo, intended recipients of the cargo, vehicle yards that hold cargo, or the like.

The input unit or device 502 can receive vehicle yard input from a yard information system 506. The vehicle yard input can include information about one or more vehicle yards that the vehicle system is currently in, that the vehicle system will travel to during movement from a current or origin location to a final destination, and/or a final destination of the vehicle system. In one embodiment, the vehicle yard input includes information on where equipment used to load and/or unload cargo from vehicle units is located in a vehicle yard. The yard information system 506 can represent one or more computer devices, such as a computer, service, handheld device (e.g., mobile phone, tablet computer, etc.), or the like, that stores the vehicle yard input. For example, the yard information system 506 may be a vehicle yard that tracks locations of the loading equipment, available routes in the vehicle yards, scheduled arrival times and/or departure times of vehicle systems at different yards, or the like.

The input unit or device 502 can receive schedule input from a schedule source 508. The schedule input can include information about where the cargo is to be transported, when the cargo is to arrive, and/or priorities of the cargo. Examples of schedule input include origin and/or destination locations of the cargo, scheduled times of delivery of the cargo, scheduled times of departure of the cargo, scheduled times of arrival of the cargo at one or more vehicle yards, commercial priorities of the cargo, contractual agreements related to the cargo (e.g., service level agreements), restrictions on delivery of the cargo (e.g., cargo that will spoil or otherwise decrease in value after a designated period of time), etc. The schedule source 508 can represent one or more computer devices, such as a computer, service, handheld device (e.g., mobile phone, tablet computer, etc.), or the like, such as those of parties to a contract for delivery of the cargo, of a vehicle yard planning system (e.g., a system that plans operations within a vehicle yard), of a scheduling system (e.g., a system that schedules movements of many vehicle systems), or the like.

The input unit or device 502 can receive power input from a power monitoring system 510. The power input can include information about one or more propulsion-generating vehicles that can be included in a vehicle system to propel the cargo being carried by the vehicle system for transportation of the cargo. This information may include the location of propulsion-generating vehicles, schedules of propulsion-generating vehicles, power outputs (e.g., horsepower) of the propulsion-generating vehicles, repair and/or maintenance histories of the propulsion-generating vehicles, or the like. The power monitoring system 510 can represent one or more computer devices, such as a computer, service, handheld device (e.g., mobile phone, tablet computer, etc.), or the like, such a scheduling system (e.g., a dispatch facility, which may be the same as the schedule source 508), a vehicle yard planning system (e.g., a system that plans operations within a vehicle yard), or the like.

The system 500 includes a building system 512 that receives the input information received by the input unit or device 502. The building system 512 includes hardware circuitry that includes and/or is connected with one or more processors, such as a specially programmed computer designed to perform the operations described herein, controllers, microprocessors, or the like. The building system 512 receives the input information and determines potential builds of one or more vehicle systems. The building system 512 can identify the locations where different vehicle units are to travel toward, locations where the vehicle units are currently located, and locations and capabilities of propulsion-generating vehicles. The building system 512 can receive constraints on builds for the vehicle system from the input unit or device, such as restrictions on how fast vehicle systems can travel on the routes between the vehicle yards, restrictions on transportation of hazardous cargo, limitations on how much weight different propulsion-generating vehicles can pull or push, etc.

The building system 512 can identify many different permutations of builds for a vehicle system that do not violate the constraints. The building system 512 may then simulate travel of the vehicle system according to one build, then simulate travel of the vehicle system according to another build, and so on. The building system 512 may then evaluate travel according to the different builds, such as by determining when the cargo carried by different vehicle units arrives at scheduled destinations, determining impacts of travel according to the build on traffic of other vehicle systems, determining how much fuel is consumed and/or emissions generated by travel according to the different builds, and the like. As described herein, the building system 512 may then select one of the builds for actually forming a vehicle system. The building system 512 may concurrently simulate travel according to different builds of the same and/or different vehicle systems.

Responsive to selecting a build for a vehicle system, the building system 512 can communicate the selected build to an output unit or device 514 of the system 500. The output unit or device 514 can represent hardware circuitry that communicates information to one or more locations outside of the system 500. For example, output unit or device 514 can include transceiving circuitry, an antenna, modem, router, cables, or the like, for communicating electronic signals to various locations. The output unit or device 514 can communicate selected builds to vehicle yards and systems of the vehicle yards that control the formation of vehicle systems in the yards to cause the vehicle systems to be formed according to the selected builds. The output unit or device 514 can communicate the selected builds to scheduling systems (e.g., dispatch facilities) to cause schedules to be created and/or modified such that the vehicle units and/or propulsion-generating vehicles in the selected builds are located in the vehicle yards where the vehicle systems are to be formed at the appropriate time. In one example, the output unit or device 514 can communicate a selected build of a vehicle system 200 to equipment that operates to build the vehicle system 200. This equipment can include propulsion-generating vehicles in a vehicle yard, cranes that load or unload cargo, robotic devices or systems that bleed brakes of vehicles or load or unload cargo, or other equipment. The selected build may be used by the equipment to autonomously create the vehicle system according to the selected build.

In one embodiment, a method (e.g., for building a vehicle system) includes determining first cargo and non-propulsion-generating vehicle units to carry the first cargo from a first location to a second location via one or more vehicle yards disposed between the first location and the second location. The method also can include determining one or more characteristics of the one or more vehicle yards and determining different builds of the vehicle system based on the first cargo, the non-propulsion-generating vehicle units, and the one or more characteristics of the one or more vehicle yards. The different builds designate different combinations of one or more of where the first cargo is carried in a vehicle system that includes the non-propulsion-generating vehicle units or where the non-propulsion-generating vehicle units are located relative to each other in the vehicle system. The method also can include selecting a first build from among the different builds for forming the vehicle system according to the first build.

In one example, determining the one or more characteristics of the one or more vehicle yards includes determining where second cargo that is scheduled to be carried by the vehicle system from a first vehicle yard is located in the first vehicle yard.

In one example, selecting the first build includes determining which of the different builds results in the non-propulsion-generating vehicle that is scheduled to carry the second cargo to be located closer to the second cargo after entry of the vehicle system into the first vehicle yard.

In one example, determining the one or more characteristics of the one or more vehicle yards includes determining where equipment that one or more of loads second cargo onto the vehicle system or removes the first cargo from the vehicle system is located within a first vehicle yard.

In one example, selecting the first build includes determining which of the different builds results in the non-propulsion-generating vehicle that carries the first cargo to the first vehicle yard to be located closer to the equipment after entry of the vehicle system into the first vehicle yard.

In one example, selecting the first build includes determining which of the different builds reduces a time period that the vehicle system is located at the one or more vehicle yards during one or more of loading second cargo onto the vehicle system, removing the first cargo from the vehicle system, adding one or more additional non-propulsion-generating vehicles to the vehicle system, or removing at least one of the non-propulsion-generating vehicles from the vehicle system.

In one example, the time period is reduced relative to the vehicle system being formed according to one or more builds of the different builds other than the first build.

In one example, the method also can include determining different locations for different vehicle units of the non-propulsion-generating vehicle units to travel to subsequent to exiting at least one of the vehicle yards. Determining the different builds of the vehicle system can be based on the different locations.

In one example, determining the different builds includes grouping sets of the non-propulsion-generating vehicle units according to which of the different locations that the non-propulsion-generating vehicle units are to travel to subsequent to exiting the at least one of the vehicle yards.

In one example, determining the different builds includes determining one or more propulsion-generating vehicles to be included in the vehicle system to propel the vehicle system and determining where the one or more propulsion-generating vehicles are to be located in the vehicle system.

In one example, determining the different builds includes determining one or more propulsion-generating vehicles assigned to a route for the purposes of servicing at least one of the propulsion-generating vehicles at a designated location (e.g., a designated service shop).

In one example, selecting the first build includes determining which of the different builds results in one or more of scheduled delivery of the first cargo at a scheduled time, scheduled delivery of the first cargo within a scheduled time window, reduced traffic congestion, or reduced wear of the vehicle system.

In one example, the method also includes selecting a propulsion-generating vehicle unit to be assigned to a route so as to enable the propulsion-generating vehicle unit that is selected to arrive at a designated location for one or more of: maintenance of the propulsion-generating vehicle that is selected in accordance with a contractual term of service, loading of cargo in accordance with the contractual term of service, obtaining a designated skill in performing one or more operations with or on the propulsion-generating vehicle that is selected, and/or obtaining one or more parts for the maintenance of the propulsion-generating vehicle that is selected.

In one example, selecting the first build includes simulating travel of the vehicle system according to the different builds and selecting the first build based on the travel that is simulated.

In one example, the method also can include communicating the first build to a first vehicle yard of the one or more vehicle yards and combining the non-propulsion-generating vehicle units as designated by the first build to form the vehicle system at the first vehicle yard.

In one example, determining the different builds includes assigning one or more of the propulsion-generating vehicle units to a set of the non-propulsion-generating vehicle units as a function of a state of fitness of one or more of the propulsion-generating vehicle units or the non-propulsion-generating vehicle units.

In one example, determining the different builds includes determining one or more of routes to be traveled or operational settings by which to control the one or more of the propulsion-generating vehicle units to ensure that one or more impairments to the one or more propulsion-generating vehicle units or the non-propulsion generating vehicle units are not exceeded above a designated level of life consumption, stress, mechanical feature, or electrical feature causing or related to the one or more impairments.

In another embodiment, a system (e.g., a vehicle building system) includes an input device configured to determine first cargo and non-propulsion-generating vehicle units to carry the first cargo from a first location to a second location via one or more vehicle yards disposed between the first location and the second location. The input device also can be configured to determine one or more characteristics of the one or more vehicle yards. The system can include one or more processors configured to determine different builds of the vehicle system based on the first cargo, the non-propulsion-generating vehicle units, and the one or more characteristics of the one or more vehicle yards. The different builds can designate different combinations of one or more of where the first cargo is carried in a vehicle system that includes the non-propulsion-generating vehicle units or where the non-propulsion-generating vehicle units are located relative to each other in the vehicle system. The one or more processors are configured to select a first build from among the different builds for forming the vehicle system according to the first build.

In one example, the one or more processors are configured to determine where second cargo that is scheduled to be carried by the vehicle system from a first vehicle yard is located in the first vehicle yard.

In one example, the one or more processors are configured to select the first build by determining which of the different builds results in the non-propulsion-generating vehicle that is scheduled to carry the second cargo to be located closer to the second cargo after entry of the vehicle system into the first vehicle yard.

In one example, the one or more processors are configured to select the first build by simulating travel of the vehicle system according to the different builds and selecting the first build based on the travel that is simulated.

In one example, the system also can include an output device configured to communicate the first build to a first vehicle yard of the one or more vehicle yards for use in combining the non-propulsion-generating vehicle units as designated by the first build to form the vehicle system at the first vehicle yard.

In another embodiment, another method (e.g., for building a vehicle system) includes determining cargo and non-propulsion-generating vehicle units to carry the cargo from a first location to a second location a vehicle yard disposed between the first location and the second location, determining one or more characteristics of the vehicle yard, determining different potential builds of the vehicle system based on the cargo, the non-propulsion-generating vehicle units, and the one or more characteristics of the vehicle yard. The different potential builds can designate different combinations of where the non-propulsion-generating vehicle units are located relative to each other in the vehicle system. The method also can include selecting a first build from among the potential builds for forming the vehicle system by determining which of the potential builds results in reduced processing time in the vehicle yard relative to one or more other builds of the potential builds.

In one example, the processing time represents time to one or more of add at least one additional non-propulsion-generating vehicles to the vehicle system, remove at least one of the non-propulsion-generating vehicles from the vehicle system, add additional cargo to the vehicle system, or remove at least part of the cargo from the vehicle system.

It is to be understood that the above description is intended to be illustrative, and not restrictive. For example, the above-described embodiments (and/or examples thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the inventive subject matter and also to enable a person of ordinary skill in the art to practice the embodiments of the inventive subject matter, including making and using any devices or systems and performing any incorporated methods. The patentable scope of the inventive subject matter is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

What is claimed is:

1. A system comprising:
   one or more processors configured to autonomously create a vehicle system according to a selected build of the vehicle system, the one or more processors configured to create the vehicle system by determining original cargo and non-propulsion-generating vehicle units to carry the original cargo from a starting location to a destination location via one or more vehicle yards disposed between the starting location and the destination location, the one or more processors also configured to determine one or more characteristics of the one or more vehicle yards;
   wherein the one or more processors are further configured to determine different builds of the vehicle system that includes the non-propulsion-generating vehicle units, the different builds determined based on the original cargo, the non-propulsion-generating vehicle units, and the one or more characteristics of the one or more vehicle yards,
   wherein the different builds designate different combinations of where the original cargo is carried in the vehicle system, where the non-propulsion-generating vehicle units are located in the vehicle system, or both where the original cargo is carried and where the non-propulsion-generating vehicle units are located,
   wherein the one or more processors are configured to select the selected build from among the different builds for forming the vehicle system according to the selected build,
   wherein the one or more processors are configured to determine where cargo-to-be-picked-up is located in an upcoming vehicle yard of the one or more vehicle yards between the starting location and the destination location, the cargo-to-be-picked-up scheduled to be picked up by and carried by the vehicle system out from the upcoming vehicle yard once the vehicle system arrives at the upcoming vehicle yard,
   wherein the one or more processors are configured to select the selected build by determining which of the different builds of the vehicle system results in the non-propulsion-generating vehicle unit that is scheduled to carry the cargo-to-be-picked-up to be located closer to the cargo-to-be-picked-up after entry of the vehicle system into the upcoming vehicle yard, and
   wherein the one or more processors also are configured to form the vehicle system according to the selected build by autonomously controlling equipment at the starting location to move the non-propulsion-generating vehicle units into an order dictated by the selected build.

2. The system of claim 1, wherein the one or more processors are configured to select the selected build by simulating travel of the vehicle system according to the different builds and selecting the selected build based on the travel that is simulated.

3. The system of claim 1, further comprising an output device configured to communicate the selected build to an upcoming vehicle yard of the one or more vehicle yards for use in combining the non-propulsion-generating vehicle units as designated by the selected build to form the vehicle system at the upcoming vehicle yard.

4. A method comprising:
   autonomously creating a vehicle system according to a selected build by determining original cargo and non-propulsion-generating vehicle units to carry the original cargo from a starting location to a destination location via one or more vehicle yards disposed between the starting location and the destination location;
   determining one or more characteristics of the one or more vehicle yards;
   determining where cargo-to-be-picked-up is located in an upcoming vehicle yard of the one or more vehicle yards between the starting location and the destination location, the cargo-to-be-picked-up scheduled to be carried by the vehicle system out from the upcoming vehicle yard;
   determining the different builds of the vehicle system that includes the non-propulsion-generating vehicle units, based on the original cargo, the non-propulsion-generating vehicle units, and the one or more characteristics of the one or more vehicle yards, the different builds designating different combinations of one or more of where the original cargo is carried in the vehicle system or where the non-propulsion-generating vehicle units are located relative to each other in the vehicle system;
   selecting the selected build from among the different builds for forming the vehicle system according to the selected build by determining which of the different builds results in the non-propulsion-generating vehicle unit that is scheduled to carry the cargo-to-be-picked-up to be located closer to the cargo-to-be-picked-up after entry of the vehicle system into the upcoming vehicle yard; and
   forming the vehicle system according to the selected build by autonomously controlling first equipment at the starting location to move the non-propulsion-generating vehicle units into an order dictated by the initial build.

5. The method of claim 4, wherein determining the one or more characteristics of the one or more vehicle yards includes determining where second equipment that one or more of loads the cargo-to-be-picked-up onto the vehicle system or removes the original cargo from the vehicle system is located within the upcoming vehicle yard.

6. The method of claim 5, wherein selecting the selected build includes determining which of the different builds results in the non-propulsion-generating vehicle unit that carries the original cargo to the upcoming vehicle yard to be located closer to the second equipment after entry of the vehicle system into the upcoming vehicle yard.

7. The method of claim 4, wherein selecting the selected build includes determining which of the different builds reduces a time period that the vehicle system is located at the one or more vehicle yards during one or more of loading the cargo-to-be-picked-up onto the vehicle system, removing the original cargo from the vehicle system, adding one or more additional non-propulsion-generating vehicles to the vehicle system, or removing at least one of the non-propulsion-generating vehicles from the vehicle system.

8. The method of claim 7, wherein the time period is reduced relative to the vehicle system being formed according to one or more builds of the different builds other than the initial build.

9. The method of claim 4, further comprising determining different locations for different vehicle units of the non-propulsion-generating vehicle units to travel to subsequent to exiting at least one of the vehicle yards, wherein determining the different builds of the vehicle system is based on the different locations.

10. The method of claim 9, wherein determining the different builds includes grouping sets of the non-propulsion-generating vehicle units according to which of the different locations that the non-propulsion-generating vehicle units are to travel to subsequent to exiting the at least one of the vehicle yards.

11. The method of claim 4, wherein determining the different builds includes determining one or more propulsion-generating vehicles to be included in the vehicle system to propel the vehicle system and determining where the one or more propulsion-generating vehicles are to be located in the vehicle system.

12. The method of claim 4, wherein selecting the selected build includes determining which of the different builds results in one or more of scheduled delivery of the original cargo at a scheduled time, scheduled delivery of the original cargo within a scheduled time window, reduced traffic congestion, or reduced wear of the vehicle system.

13. The method of claim 4, further comprising selecting a propulsion-generating vehicle unit to be assigned to a route so as to enable the propulsion-generating vehicle unit that is selected to arrive at a designated location for one or more of:
  maintenance of the propulsion-generating vehicle unit that is selected in accordance with a contractual term of service,
  loading of the cargo-to-be-picked-up in accordance with the contractual term of service,
  obtaining a designated skill in performing one or more operations with or on the propulsion-generating vehicle unit that is selected, or
  obtaining one or more parts for the maintenance of the propulsion-generating vehicle unit that is selected.

14. The method of claim 4, wherein selecting the selected build includes simulating travel of the vehicle system according to the different builds and selecting the selected build based on the travel that is simulated.

15. A method comprising:
  creating a vehicle system autonomously according to a selected build responsive to determining cargo and non-propulsion-generating vehicle units to carry the cargo from a starting location to a destination location via a vehicle yard disposed between the starting location and the destination location;
  determining one or more characteristics of the vehicle yard;
  determining the different potential builds of the vehicle system that includes the non-propulsion-generating vehicle units based on the cargo, the non-propulsion-generating vehicle units, and the one or more characteristics of the vehicle yard, the different potential builds designating different combinations of where the non-propulsion-generating vehicle units are located relative to each other in the vehicle system;
  selecting the selected build from among the potential builds for autonomously forming the vehicle system by determining which of the potential builds results in reduced processing time in the vehicle yard relative to one or more other builds of the potential builds due to at least one of the non-propulsion-generating vehicle units being located closer to equipment at the vehicle yard for one or more of unloading the cargo from the at least one non-propulsion-generating vehicle unit or loading additional cargo onto the at least one non-propulsion-generating vehicle unit; and
  forming the vehicle system by placing the non-propulsion-generating vehicle units in an order dictated by the selected build in the starting location.

16. The method of claim 15, wherein the processing time represents time to one or more of add at least one additional non-propulsion-generating vehicle units to the vehicle system, remove at least one of the non-propulsion-generating vehicle units from the vehicle system, add additional cargo to the vehicle system, or remove at least part of the cargo from the vehicle system.

17. The system of claim 1, wherein the one or more processors are configured to select the selected build based on the selected build having smaller differences in height of neighboring vehicle units of the non-propulsion-generating vehicle units relative to one or more other builds of the different builds.

18. The method of claim 4, wherein the selected build is selected also based on the selected build having smaller differences in height of neighboring vehicle units of the non-propulsion-generating vehicle units relative to one or more other builds of the different builds.

19. The method of claim 15, wherein the selected build is selected also based on the selected build having smaller differences in height of neighboring vehicle units of the non-propulsion-generating vehicle units relative to one or more other builds of the potential builds.

* * * * *